J. W. Trout,
Stave Machine.
No. 86,607. Patented Feb. 2, 1869.
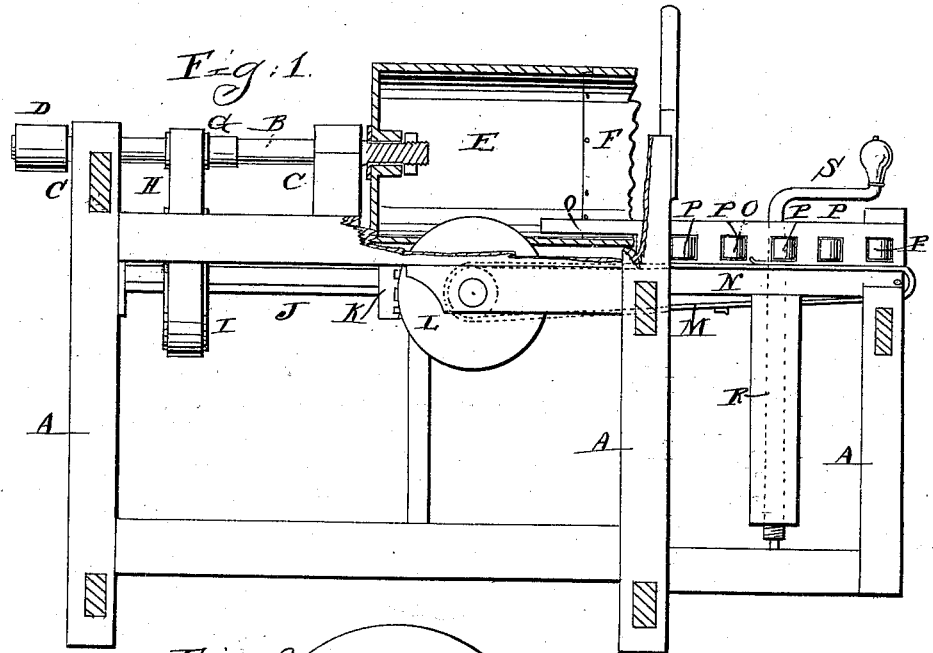
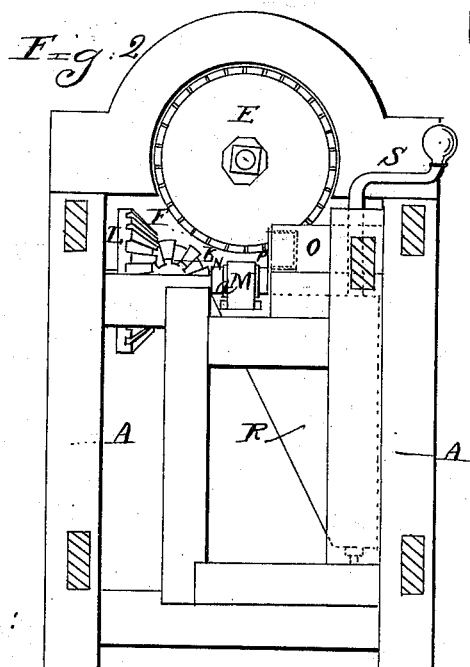
Witnesses:
Harry King
Leopold Evert
Inventor:
J. W. Trout
per Alexander & Mason
Attys

J. W. TROUT, OF ARCOLA, ILLINOIS.

*Letters Patent No. 86,607, dated February 2, 1869.*

IMPROVEMENT IN MACHINE FOR SAWING STAVES.

The Schedule referred to in these Letters Patent and making part of the same.

*To all whom it may concern:*

Be it known that I, J. W. TROUT, of Arcola, in the county of Douglas, and in the State of Illinois, have invented certain new and useful Improvements in Machine for Sawing Barrel-Staves; and do hereby declare that the following is a full, clear, and exact description thereof, reference being had to the accompanying drawings, and to the letters of reference marked thereon.

My invention relates to that class of machines which are used for the purpose of cutting barrel-staves; and consists in the arrangement of the adjustable table and belt with the guide for carrying the billet of wood, from which the staves are to be cut, into the tubular saw; also, in the arrangement of the tubular saw on the frame, as will be hereinafter more fully set forth.

In order to enable others skilled in the art to which my invention appertains, to make and use the same, I will now proceed to describe its construction and operation, referring to the annexed drawings, which form a part of this specification, and in which—

Figure 1 is a side elevation, part in section, and

Figure 2, an end view.

A represents a frame, of suitable dimensions, in the rear part of which a shaft, B, is placed, said shaft having its bearings on two cross-bars, C C, as seen in fig. 1.

To the rear end of said shaft, a pulley, D, is secured, which pulley will be connected with some suitable power for operating the machine.

To the front of said shaft B, the tubular saw is firmly secured.

The tubular saw consists of a metal cylinder, E, which is provided with a bottom, and placed horizontally, bottom toward the rear.

The front end of the shaft B is passed through the centre of said bottom, and firmly secured by a nut, or other suitable means, so that when the shaft B is turned, the cylinder E will revolve.

To the front edge of the cylinder, the saw F is secured in such a manner as to form no edges at the joints, but as smooth and even a surface as possible.

The saw F may be a straight saw, bent so as to conform to the circular shape of the cylinder, and the ends nicely joined together, or may be made with the cylinder in one piece, if desired.

On the shaft B, between the cross-bars C C, is a pulley, G, which, by means of a belt, H, is connected with and communicates motion to the wheel I and the shaft J, placed at a suitable point in the frame A.

At the front end of the shaft J is a pinion, K, which gears into another pinion, L, communicating motion to a cross-shaft in the frame A.

On this cross-shaft is a small pulley, around which is a belt, M.

This belt passes around a table, N, which is placed under and in front of the centre of the saw F, and is, at the front end, provided with a pulley. *a.* to allow the belt to pass freely around.

On the table N, the billet, from which the staves are to be cut, is placed, being moved forward into the tubular saw by means of the belt M, the stave falling down beneath the saw, and the rest of the billet entering the cylinder E.

The billet of wood, when placed on the table N, is guided by the stationary guide O, placed alongside of the table, and provided with rollers P P, to allow the wood to pass forward easily. A part of the guide O enters the tubular saw, to guide the wood the whole distance.

The table N is adjustable, resting on the foot R, which can be raised or lowered at will, by means of the screw S, so that the staves may be cut any thickness desired.

Having thus fully described my invention,

What I claim as new, and desire to secure by Letters Patent, is—

1. The arrangement of the adjustable table N, belt M, guide O, and rollers P P, all constructed substantially as and for the purposes herein set forth.

2. The arrangement of the adjustable saw F, upon the movable cylinder E, with the adjustable table N, belt M, guide O, and rollers P, when all the parts are constructed as shown and described.

In testimony that I claim the foregoing, I have hereunto set my hand, this 11th day of September, 1868.

J. W. TROUT.

Witnesses:
  JESSE SHIELDS,
  ALLIEN CAMBELL.